(12) United States Patent
Jensen

(10) Patent No.: US 9,471,531 B2
(45) Date of Patent: *Oct. 18, 2016

(54) ADAPTIVE ISOCHRONOUS USB AUDIO TO RF COMMUNICATION DEVICE

(71) Applicant: GN Netcom A/S, Ballerup (DK)

(72) Inventor: Rene Elbæk Jensen, Bagsværd (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,569

(22) Filed: Jul. 21, 2015

(65) Prior Publication Data

US 2015/0324322 A1 Nov. 12, 2015

Related U.S. Application Data

(63) Continuation of application No. 13/718,298, filed on Dec. 18, 2012, now Pat. No. 9,170,981.

(30) Foreign Application Priority Data

Dec. 19, 2011 (EP) .................................. 11194265

(51) Int. Cl.
*G06F 17/00* (2006.01)
*G06F 13/42* (2006.01)
(Continued)

(52) U.S. Cl.
CPC ......... *G06F 13/4291* (2013.01); *G06F 13/102* (2013.01); *G06F 17/00* (2013.01); *H04L 7/02* (2013.01); *H04L 7/04* (2013.01)

(58) Field of Classification Search
CPC .... H04L 7/02; H04L 7/0012; G06F 13/4217
USPC ............ 700/94, 95; 713/375, 400, 500–503; 725/80
See application file for complete search history.

(56) References Cited

U.S. PATENT DOCUMENTS 5,189,411 A * 2/1993 Collar .................... G04G 21/04
340/7.2
6,061,802 A * 5/2000 Gulick ...................... G06F 1/12
713/400

(Continued)

FOREIGN PATENT DOCUMENTS

| CN | 201222362 | 6/2008 |
| WO | WO 2004/006485 | 1/2004 |
| WO | WO 2007/092997 | 8/2007 |

OTHER PUBLICATIONS

Liming Xiu et al. : "Flying-Adder PLL Based Synchronization Mechanism for Data Packet Transport", System-On-Chip, 2007, DCAS 2007, 6th IEEE Dallas Circuits and Systems Workshop on, ISSS, PI, Nov. 1, 2007, pp. 1-5, XP031203950, ISBN: 978-1-4244-1679-0.

(Continued)

*Primary Examiner* — Jesse Elbin
*Assistant Examiner* — Julie X Dang
(74) *Attorney, Agent, or Firm* — Altera Law Group, LLC

(57) ABSTRACT

A method of and a system for synchronizing isochronous audio data frames provided by a USB interface to a clock of a wireless RF communication device is provided. The USB interface and the wireless RF communication device are connected via an I2S link, the method comprising receiving the isochronous audio data frames and the wireless RF communication device clock in a streaming controller, phase locking the isochronous audio data frames to a USB interface clock, counting start-of-frame pulses of the phase locked isochronous audio data frames, comparing the counted start-of-frame pulses with the wireless RF communication device clock to determine a difference signal, the difference signal triggering a synchronization event code when a threshold difference has been reached, rate matching the isochronous audio data frames to the wireless RF communication device clock upon receiving the synchronization event code.

17 Claims, 4 Drawing Sheets

(51) Int. Cl.
  *G06F 13/10* (2006.01)
  *H04L 7/02* (2006.01)
  *H04L 7/04* (2006.01)

(56) References Cited

U.S. PATENT DOCUMENTS 8,583,269 B2 * 11/2013 Buckwalter ....... H04L 29/06027
                                                              700/94

2008/0040759 A1 * 2/2008 She ................... H04L 29/06027
                                                              725/81
2009/0011729 A1   1/2009 Ikeda et al.
2010/0077247 A1   3/2010 McHarg et al.

OTHER PUBLICATIONS

English translation of Chinese Office Action for Chinese application No. 2012105520499 dated Oct. 24, 2014.

* cited by examiner

ADAPTIVE ISOCHRONOUS USB AUDIO TO RF COMMUNICATION DEVICE

FIELD OF INVENTION

The present invention relates to audio data, and especially to a method of synchronizing audio data provided by a USB interface to a wireless RF communication device and a device for performing the synchronization.

BACKGROUND OF THE INVENTION

Audio programs, for e.g. Voice over IP, audio streaming, etc., are well-known, and software for these programs are readily available for installation on a computer. The data stream may be provided to an external device, such as headphones, mixers, loudspeakers, headsets, etc. Typically, a wired connection has been made via audio jacks for providing audio to speakers and receiving input from microphones.

However, the wired connections tying a user to the computer are in many situations not advantageous, and consequently, wireless devices may be preferred. Wireless devices may be connected directly to the computer, using e.g. the Bluetooth standard. It may however for some applications be advantageously to connect the computer to a wireless RF hub using a USB interface.

The communication of audio data between the USB interface and the RF hub may prove challenging, especially for low latency applications, such as telephony.

It has been suggested to use an adaptive mode in which the computer controls the audio transfer rate and the USB has to update a master clock e.g. every one millisecond. However, this requires a complex frequency synthesizer, and may not be an available option for all computer operating systems in that different operating systems provide different control signals.

It is also known to use a synchronous data stream and provide a buffer to buffer incoming data having a first sample rate and outputting data at a second sample rate. However, for low latency data, such as in telephony systems, the delay caused by the buffer is typically not acceptable.

In another approach, the digital signal provided by the USB interface is converted into an analog signal, and the analog signal is provided to an ND converter providing the converted digital signal to the RF wireless device. However, this method is complex, requires a D/A and an ND converter, and results in the loss of data and thus a loss of signal information at each conversion.

Thus, there is a need for an improved communication of audio data between a USB interface and a wireless RF hub.

SUMMARY OF INVENTION

It is an object of the present invention to provide an improved communication of audio data between a USB interface and a wireless RF hub.

According to the above and other objects, a method of synchronizing isochronous audio data frames provided by a USB interface to a clock of a wireless RF communication device is provided. The USB interface and the wireless RF communication device are being connected via a serial audio link. The method comprises receiving the isochronous audio data frames and the wireless RF communication device clock in a streaming controller, synchronizing the isochronous audio data frames to a USB interface clock, counting start-of-frame pulses of the synchronized isochronous audio data frames. The counted start-of-frame pulses may be compared with the wireless RF communication device clock to determine a difference signal. Preferably, the difference signal triggers a synchronization event code when a threshold difference has been reached, and rate matches the isochronous audio data frames to the wireless RF communication device clock upon receiving the synchronization event code.

In a further aspect, a system configured to provide audio data frames between a USB interface and a wireless RF communication device is provided, the system comprising a USB interface having adaptive endpoints providing start-of-frame pulses to an adaptive USB streaming controller, a serial audio link connecting the adaptive USB streaming controller to at least the wireless RF communication device, the wireless RF communication device having an RF transceiver (transponder), and a wireless RF communication device clock generator. A digital signal processor is provided being configured to receive and compare the wireless RF communication device clock and the start-of-frame pulses to determine a clock difference signal. The clock difference signal preferably triggering a synchronization event code when a threshold difference has been reached. The digital signal processor may be further be configured to generate a rate match output to synchronize the audio stream to the wireless RF communication device clock upon triggering.

The start-of-frame pulses provided by the adaptive USB endpoints are typically synchronous with the receipt of start-of-frame packets in the audio data stream.

In another aspect of the invention, a synchronized communication system comprising a wireless RF communication device and a computer device having a USB interface is provided, the system comprising a streaming controller configured to receive isochronous audio data frames provided by the USB interface and a wireless RF communication device clock, a serial audio link interconnecting the streaming controller and the wireless RF communication device, a phase locked loop configured to phase lock the isochronous audio data frames to a USB interface clock, a counter configured to count start-of-frame pulses of the phase locked isochronous audio frames, a comparator for comparing the counted start-of-frame pulses with the RF communication device clock to determine a clock difference signal wherein the clock difference signal preferably triggers a synchronization event code when a threshold difference has been reached.

The system may further comprise a rate matching entity configured to rate match the isochronous audio data frames to the RF communication device clock upon receiving the synchronization event code to thereby synchronize the audio data frames with the wireless RF communication device clock.

The streaming controller may be configured to connect the USB interface and the wireless RF communication device, for example such as to provide for two-way communication between the USB interface and the wireless RF communication device. It is envisaged that the synchronization applies equally to audio data provided by the USB interface and audio data provided from the wireless RF communication device.

The USB interface may comprise a phase locked loop configured to adaptively phase lock the isochronous audio data frames to a USB interface clock.

The streaming controller is preferably adaptive to the USB interface.

It is an advantage of using an adaptive streaming controller that the synchronization of the system is performed front-end. The rate matching may be performed as soon as a predetermined threshold for the clock difference signal is reached, thus, avoiding a delay caused by e.g. awaiting signal buffer filling, and re-acting on the filling state of the buffers as seen when using an asynchronous data stream. The predetermined threshold is determined on the basis of system parameters and may be ranging from a half or a single clock period to a plurality of clock periods depending on e.g. the acceptable delay for the system.

It is furthermore an advantage that the adaptive streaming controller is independent of operating system parameters. Thus, no specific signals, such as clock information signals, such as information about a signal frequency, are required to be provided from the operating system to the adaptive streaming controller. The adaptive streaming controller may therefore be used for any USB interface, irrespective of which operating system is providing data to the USB interface and which type of data streams are supported by the operating system. Thereby, the synchronization method and system is independent of differences in signal communication between for example Windows, iOS, Linux, Android, etc, and the USB interface, and thus independent on which signals the different operating systems provides.

In the Universal Serial Bus specification, isochronous data flow is one of the four data flow types for the USB devices, the others being Control, Interrupt and Bulk, and the isochronous dataflow is thus always available from the USB interface. The isochronous data stream is commonly used for streaming data types such as video or audio sources.

The USB specification specifies that USB devices send and receive data through endpoints. Typically, at least the endpoints IN, OUT, CONTROL and INTERRUPT are specified. Adaptive isochronous audio endpoints, or adaptive endpoints, are able to source or sink data at any rate within their operating range. This implies that these endpoints must run an internal process that allows them to match their natural data rate to the data rate that is imposed at their interface.

The USB specification also specifies the Start-of-frame, SOF, tracking. It is known from the USB specification that functions supporting isochronous pipes will be able to receive and comprehend SOF token. In isochronous transfers, the appropriate data may be transmitted in the corresponding (micro)frame. When an isochronous transfer is presented to the Host Controller, it may identify the (micro) frame number for the first (micro)frame, and the Host Controller may not transmit the first transaction before the indicated (micro)frame number. Each subsequent transaction in the I/O Request Packet, IRP, may be transmitted in succeeding (micro)frames (except for high-speed high-bandwidth transfers where up to three transactions may occur in the same microframe). If there are no transactions pending for the current (micro)frame, then the Host Controller may not transmit anything for an isochronous pipe. If the indicated (micro)frame number has passed, the Host Controller may skip (i.e., not transmit) all transactions until the one corresponding to the current (micro)frame is reached.

In one or more embodiments, the serial audio link interconnecting the USB interface and the wireless RF communication device is an Inter IC-sound (I2S) bus, a serial link developed especially for digital audio and implementing an electrical serial bus interface standard for connecting digital audio devices together. The I2S link is configured to transfer audio data separately from other signals such as sub-coding and control clock. By separating the data and clock signals, time-related errors possibly causing jitter are minimized, increasing the quality of the signal transmitted and effectively eliminating the need for any anti-jitter devices.

The wireless RF communication device may comprise a clock generator, such as a quartz crystal, setting the RF domain clock, and the wireless RF communication device clock may be a master clock for the serial audio link, such as the I2S link.

The streaming controller may comprise a counter for counting start-of-frame pulses of the synchronized, or in some embodiments the phase locked, isochronous audio data frames, and a comparator for comparing the counted start-of-frame pulses with the wireless RF communication device clock. A counter for the wireless RF communication device clock may be implemented in a digital signal processor of the RF communication device providing the wireless RF communication device clock count signal to the streaming controller and comparing this clock count with the counted start-of-frame pulses to determine a difference signal. It is envisaged that also further or all parts of the streaming controller may be implemented in the digital signal processor of the wireless RF communication device.

The USB interface may at predetermined time intervals, e.g. every 1 millisecond, detect a start-of-frame pulse, being synchronous with a receipt of start-of-frame packets.

By counting the start-of-frame pulses, the time is measured at the USB interface, and thus in the USB host time domain. As described above, the I2S interface is typically synchronized to the RF time domain and provides a pulse for every new sample on the digital serial audio link. By counting those pulses, time is measured in the audio sub system of the RF domain. Thereby, by comparing the start-of-frame pulses with the RF domain pulses, the difference is detected between the USB interface time domain and the RF time domain. When this difference reaches a maximum value, i.e. when the difference signal reaches a predetermined threshold, an event synchronization code is triggered to allow synchronization of the signals.

The difference signal may thus trigger a synchronization event code when a threshold difference has been reached. This may cause a rate matching to take place, rate matching the isochronous audio data frames to the wireless RF communication device clock upon receiving the synchronization event code.

The synchronization event code may comprise an interrupt, and the interrupt may be routed via an event router to the digital signal processor of the wireless RF communication device wherein the rate matching may be processed.

The rate matching, or re-synchronising, may be performed using any known re-sampling, including fractional up and down sampling, and may e.g. be performed by inserting or removing audio samples from the isochronous audio data stream.

In one or more embodiments, the wireless RF communication device may be a wireless hub, such as a wireless hub configured to communicate with a headset. Thus, the USB may interconnect e.g. an IP phone, or other soft phone application on a personal computer, or other computing device, with a wireless RF hub providing a wireless connection to a headset. The wireless RF hub may communicate with the headset via any known RF protocol, such as DECT, Bluetooth, etc.

The isochronous audio data frames may thus be low-latency frames, such as in telephony where only very short delays provide an acceptable connection. However, also other low latency applications could be envisaged for example in networking services and equipment for industrial automation, in-vehicle networking, and other systems requiring low latency connections The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTION OF THE DRAWINGS

Figure 1:
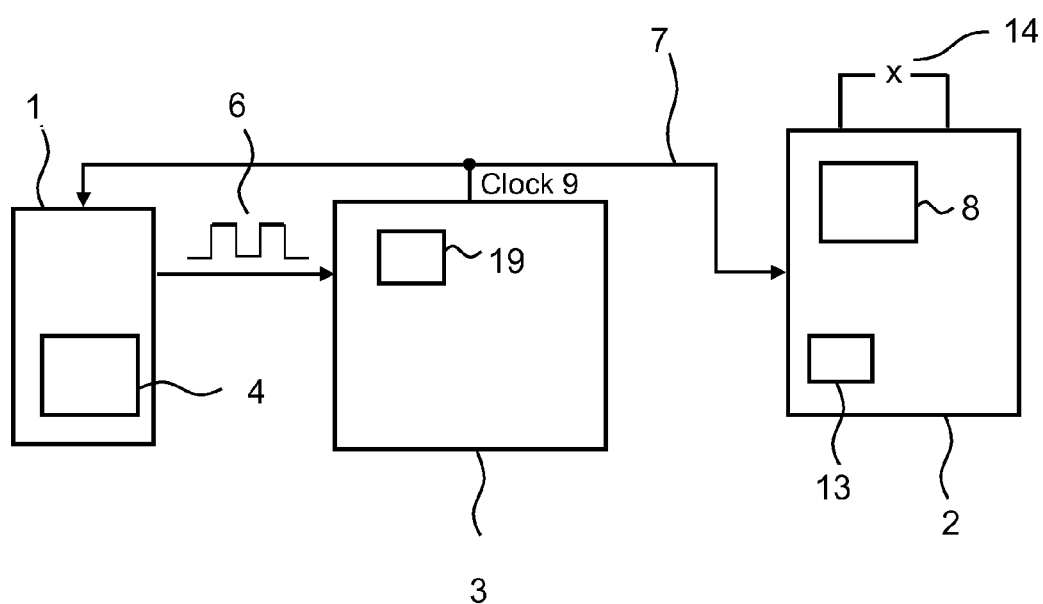
FIG. 1 shows schematically a system configured to provide audio data frames from a USB interface to a wireless RF communication device.

FIG. 1 shows schematically a system configured to provide audio data frames from a USB interface 1 to a wireless RF communication device 2. The USB interface may form part of a USB front end. The audio data frames are provided isochronous by the USB host to the USB interface. A USB host, not shown in FIG. 1, provides a clock signal for the USB interface. A synchronizer 4 is provided in the USB interface and receives the clock signal for the USB interface and the audio data frames. The synchronizer 4 is configured to synchronize the audio data frames to the USB clock and detects start-of-frame packets. A start-of-frame pulse is generated for each detected start-of-frame packet, and the start-of-frame pulses 6 are thus synchronous with the audio data frames. The start-of-frame pulses 6 are provided to streaming controller 3.

The audio data frames are provided to the wireless RF communication device via the audio serial link 7.

The wireless RF communication device 2 comprises an RF transceiver 8 configured for communication with a headset or any other wireless audio device, and a digital signal processing unit, DSP 13. The wireless RF communication device further comprises a clock generator 14, such as a crystal oscillator, such as for example a quartz crystal 14, A serial audio link 7 being an I2S link connects the USB interface 1 and the wireless RF communication device 2. The streaming controller 3 is configured to receive the wireless RF communication device clock 9 generated by the clock generator 14, and compare the wireless RF communication device clock 9 with detected start-of-frame pulses to determine a clock difference signal. The wireless RF communication device clock is provided to the streaming controller 3 via the clock line on the I2S bus.

The streaming controller 3 comprises a comparator 19, and the clock difference signal is compared to a threshold difference. If the threshold difference is reached, a synchronization event code is triggered generating a rate match output to synchronize the audio stream to the wireless RF communication device clock. The synchronization event code may be provided by the streaming controller 3 in the form of an interrupt, the interrupt triggering a synchronization of the signals.

Figure 2:
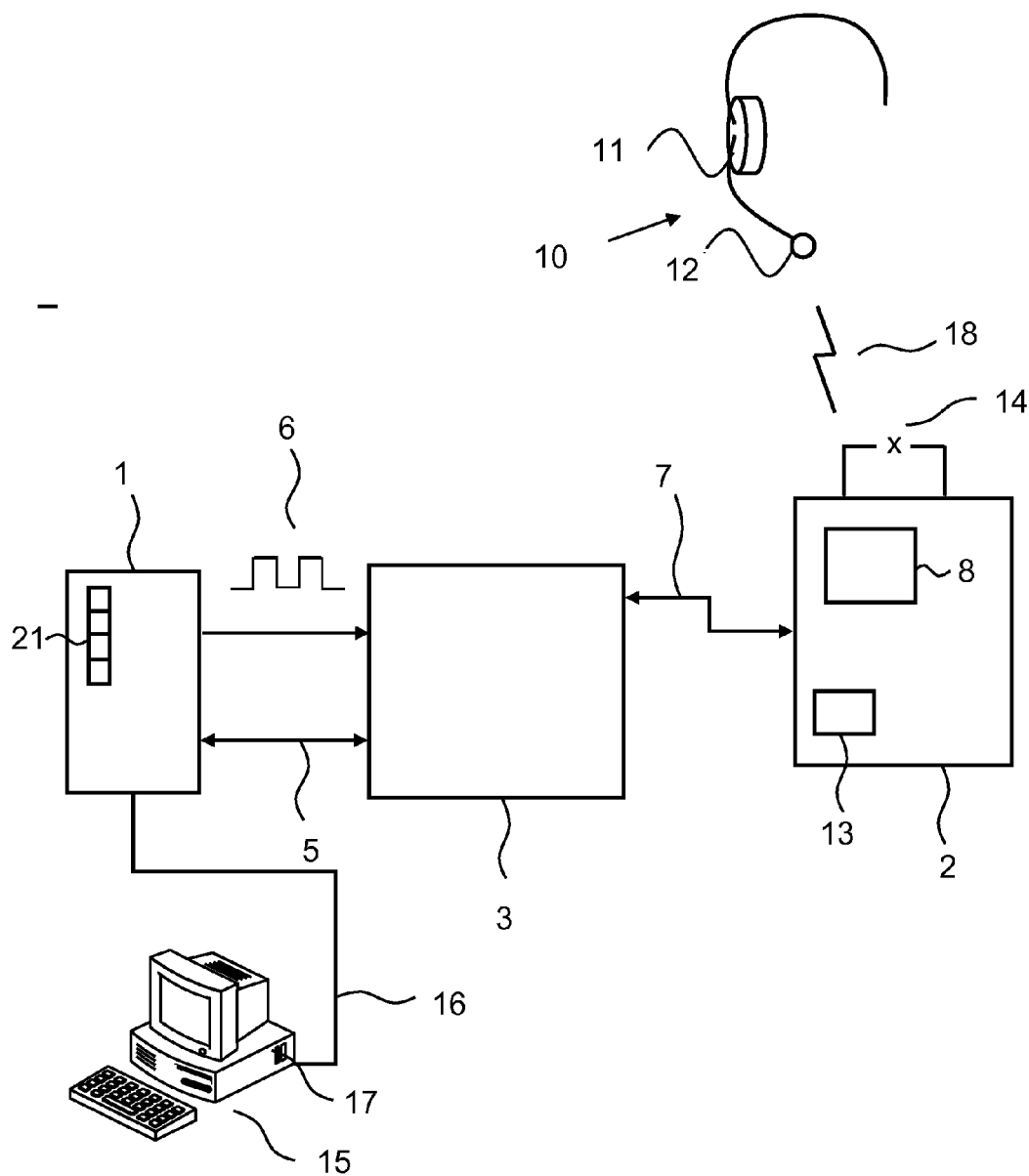
FIG. 2 shows a synchronized communication system comprising a wireless RF communication device and a computer device having a USB interface.

FIG. 2 shows a synchronized communication system comprising a wireless RF communication device and a computer device 15 having a USB interface. The audio serial link 7, 5 is seen to pass through the streaming controller 3. In FIG. 2, the adaptive endpoints 21, IN, OUT, CONTROL and INTERRUPT provides start-of-frame pulses, the start-of-frame pulses being generated for each detected start-of-frame packet and are synchronized to the USB clock. The wireless RF communication device and the computer device are bridged by a streaming controller 3. The reference numerals as shown in FIG. 2 corresponds to those of FIG. 1, and will not be described in detail with respect to FIG. 2. It is shown that in this particular embodiment, the wireless RF communication device is a wireless hub for communication wirelessly via link 18 with wireless headset 10, such as a headset having a microphone 12 and an ear piece 11.

The computer 15 provides for a USB output 16 which is provided to the USB interface 1.

Figure 3:
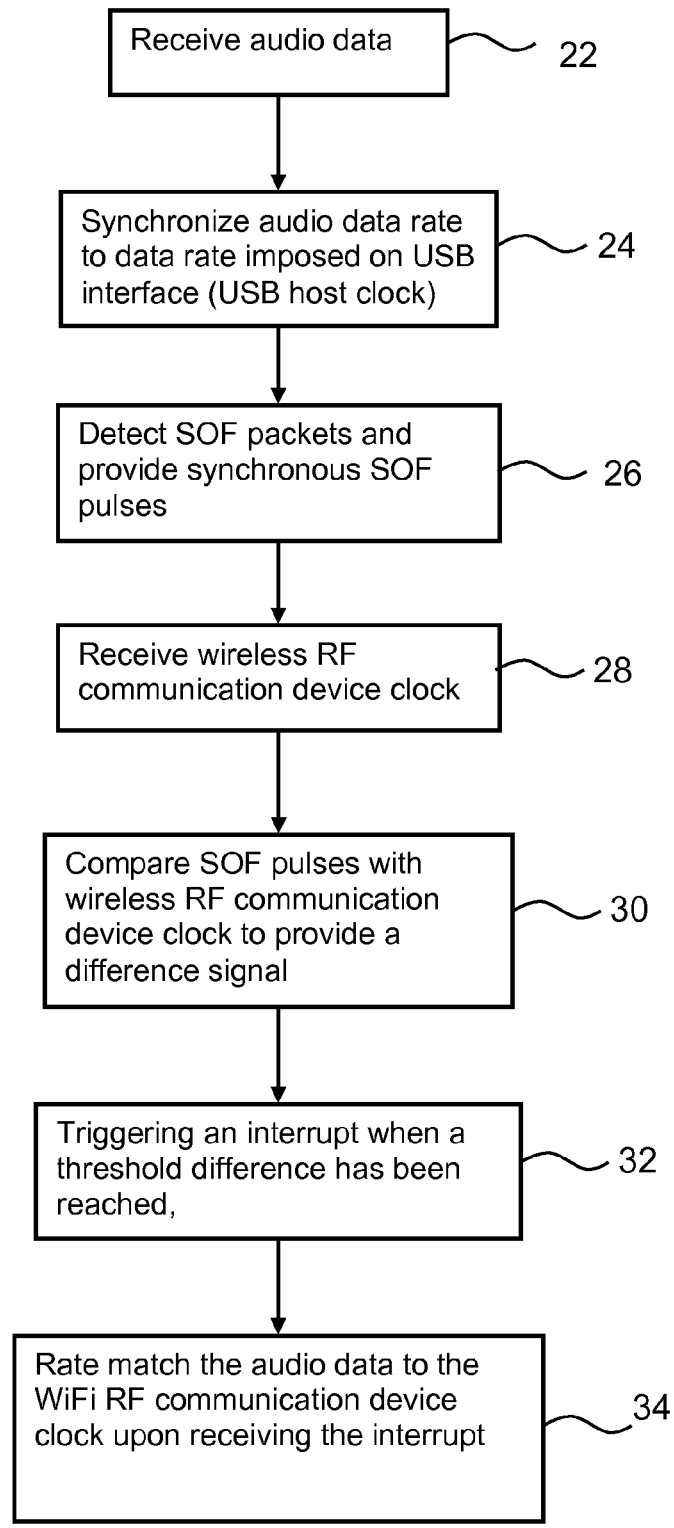
FIG. 3 shows a flowchart describing a method according to the present invention.

In FIG. 3, a flowchart 22 for a method of synchronizing isochronous audio data frames provided by a USB interface to a clock of a wireless RF communication device is shown. The method comprises receiving isochronous audio data frames provided by a USB interface in step 22.

According to the USB specification, adaptive isochronous audio endpoints, or adaptive endpoints, are able to source or sink data at any rate within their operating range. This implies that these endpoints must run an internal process that allows them to match their natural data rate to the data rate that is imposed at their interface. The synchronization occurs in step 24, wherein the isochronous audio data frames are synchronized to a USB interface clock, which may be the same as the USB host clock. In step 26, start-of-frame packets are detected, and start-of-frames pulses synchronous with the data rate, i.e. the start-of-frame packets, are provided. In step 28, the wireless RF communication device clock is received, and, in step 30, the start-of-frame pulses are compared with the wireless RF communication device clock to provide a difference signal. In step 32, the difference signal triggers a synchronization event code when a threshold difference has been reached. The method further comprises, in step 34, rate matching the isochronous audio data frames to the wireless RF communication device clock upon receiving the synchronization event code.

The rate matching to be performed is determined on the basis of the difference signal, so that, for example, if it is determined that after a predetermined time period, the start-of-frame pulses are lagging the wireless RF communication device clock when the threshold difference is reached, a sample may be inserted into the audio stream, and likewise if it is determined that the start-of-frame pulses are leading the wireless RF communication device clock when the threshold difference is reached, and, thus the rate matching triggered, a sample may be removed from the audio stream. It is however envisaged that any method and/or any algorithm for rate matching may be used in combination with the method as herein described. Typically, the USB interface and the streaming controller are connected via a serial audio link, such as an I2S link.

Figure 4:
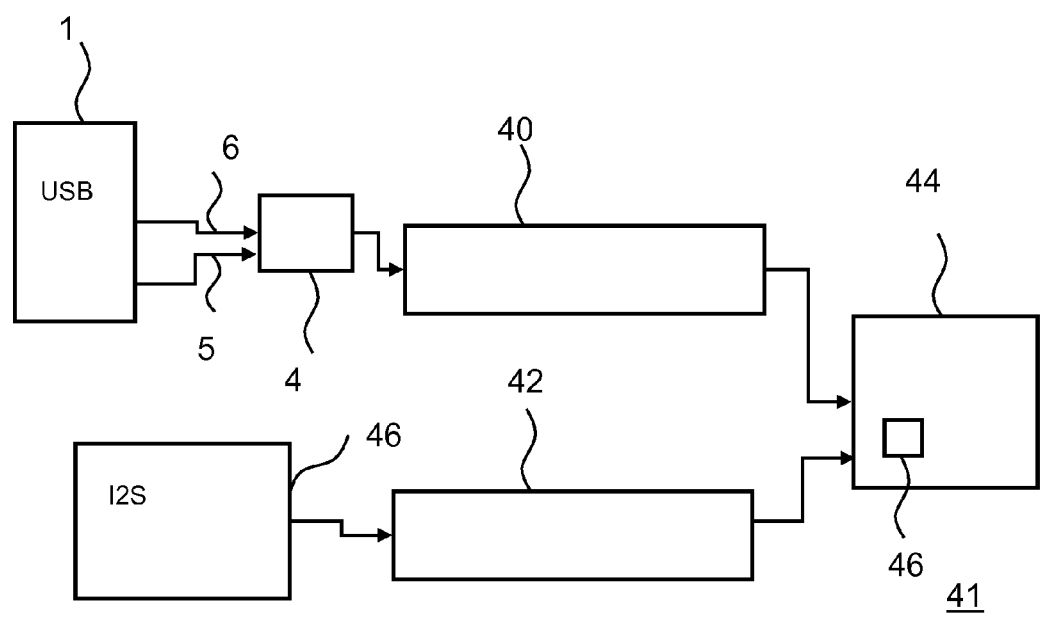
FIG. 4 shows an exemplary synchronized communication system.

FIG. 4 shows an exemplary synchronized communication system 41. The synchronization is performed using a PLL for synchronizing. PLL 4 receives the isochronous audio stream 5 and the USB interface clock 6 from the USB interface 1 and phase locks the audio stream 5 to the USB interface clock 6. The start-of-frame packets of the phase locked signal are determined and corresponding start-of-frame pulses are provided to the counter 40. The counter 40 receives the start-of-frame pulses. The start-of-frame pulse count is provided to the processor 44 comprising at least a comparator 46.

The clock signal for the wireless RF communication device and audio data from the wireless RF communication device is received on the I2S bus 46. The clock signal is counted in counter 42, and provided to processor 44 comprising at least a comparator 46. The two counts are compared and a difference signal is generated corresponding to the clock signal difference between the signal provided by the wireless RF communication device 2 and the signal provided by the USB interface 1. When the difference signal reaches a threshold difference an event synchronization code is triggered, so that a rate matching of the audio stream 5 is performed. The rate matching may be performed in the processor 44. It is envisaged that the streaming controller 3 may be fully or partly integrated with a Digital Signal Processor, DSP, in the wireless RF communication device.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as being a reference to the plural and vice versa.

In the description above, it will be understood that when an element such as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Likewise, the invention may be embodied using more elements than depicted in the drawings, wherein functions carried out by one component in the embodiment provided may be distributed over multiple components.

A person skilled in the art will readily appreciate that various parameters disclosed in the description may be modified and that various embodiments disclosed and/or claimed may be combined in any way without departing from the scope of the invention.

The invention claimed is:

1. A method of synchronizing isochronous audio data frames while avoiding a delay caused by interruption of the audio stream, and re-acting on of a two-way low latency voice telephonic audio stream provided by an interface to a clock of a wireless RF communication device, the interface and the wireless communication device being connected via an audio link, the method comprising:
    receiving the isochronous voice audio data frames and the wireless communication device clock,
    synchronizing a data rate of the isochronous audio data frames to an interface clock,
    counting start-of-frame pulses of the synchronized isochronous audio data frames, establishing a predetermined threshold of differences between the clock and start of frame pulses;
    comparing the counted start-of-frame pulses with the wireless communication device clock to determine a difference signal, the difference signal triggering a synchronization event code when said predetermined threshold difference has been reached,
    rate matching the isochronous audio data frames to the wireless communication device clock upon receiving the synchronization event code
    wherein, if the start of frame pluses are lagging the wireless clock, samples are inserted into the audio stream, and wherein, if the start of frame pluses are leading the wireless clock, samples are removed from the audio stream.

2. A method according to claim 1, wherein the serial audio link is an Inter IC-sound bus.

3. A method according to claim 1, wherein the data rate of the isochronous audio data frames is synchronized to the interface clock using a phase locked loop.

4. A method according to claim 1, where in the rate matching is performed using fractional down- and up-sampling.

5. A method according to claim 1, wherein the start-of-frame pulses are synchronous with a receipt of start-of-frame packets.

6. A method according to claim 1, wherein the wireless communication device is a wireless hub.

7. A method according to claim 6, wherein the wireless hub is configured to communicate with a headset.

8. A method according to claim 1, wherein the isochronous audio data frames are low-latency frames.

9. A method according to claim 1, wherein the streaming controller is adaptive to the interface.

10. A method according to claim 1, wherein the synchronization event code comprises an interrupt.

11. A method according to claim 1, wherein the start-of-frame pulse is detected at predetermined time intervals.

12. A system configured to provide low latency voice audio data frames between a USB interface and a wireless RF communication device of a two-way telephonic audio stream, while avoiding a delay caused interruption of the audio stream, the system comprising:
    an interface having endpoints providing start-of-frame pulses to a streaming controller,
    a serial audio link connecting the interface to the wireless communication device, the wireless RF communication device having an RF transceiver, and a wireless RF communication device clock generator,
    a processor configured to receive and compare the wireless communication device clock
    a detector for determining the time differential between the clock and start of frame pulses;
    a comparator for determining whether the differential measured by the counter reaches a predetermined threshold and triggering a synchronization event code when said predetermined threshold has been reached;
    a rate match synchronizer to synchronize the audio stream to the wireless communication device clock as follows:
    if the start of frame pluses are lagging the wireless clock, inserting samples into the audio stream, and if the start of frame pluses are leading the wireless clock, removing samples from the audio stream, to maintain synchronization.

13. A system according to claim 12, wherein the start-of-frame pulses are synchronous with the receipt of start-of-frame packets.

14. A system according to claim 12, wherein the wireless communication device clock is a master clock for the serial audio link.

15. A synchronized communication system for two-way telephonic audio streams, comprising a wireless communication device and an interface, while avoiding a delay caused buffer filling or other suspension of the audio stream, the system comprising:
- a streaming controller configured to receive isochronous audio data frames provided by the interface and a wireless communication device clock;
- a serial audio link interconnecting at least the streaming controller and the wireless communication device,
- a phase locked loop configured to phase lock the isochronous audio data frames to an interface clock;
- a counter configured to count start-of-frame pulses of the phase locked isochronous audio frames;
- a comparator for comparing the counted start-of-frame pulses with the communication device clock to determine a clock difference signal, the clock difference signal triggering a synchronization event code when a threshold difference has been reached;
- a rate matching entity configured to rate match the isochronous audio data frames to the communication device clock upon receiving the synchronization event code to thereby synchronize the audio data frames with the wireless communication device clock the rate matching being: if the start of frame pluses are lagging the wireless communication device, inserting samples into the audio stream, and if the start of frame pluses are leading the wireless communications device, removing samples from the audio stream, to maintain synchronization.

16. A method according to claim 1, wherein the steps of receiving the isochronous audio data frames and the wireless communication device clock, synchronizing a data rate of the isochronous audio data frames to an interface clock, counting start-of-frame pulses of the synchronized isochronous audio data frames, comparing the counted start-of-frame pulses with the wireless RF communication device clock to determine a difference signal, the difference signal triggering a synchronization event code when a threshold difference has been reached, and rate matching the isochronous audio data frames to the wireless communication device clock upon receiving the synchronization event code are performed by a streaming controller configured to connect the interface and the wireless communication device.

17. A method according to claim 16, including an interface having adaptive endpoints providing start-of-frame pulses to an adaptive streaming controller and wherein the streaming controller is adaptive to the interface.

* * * * *